UNITED STATES PATENT OFFICE.

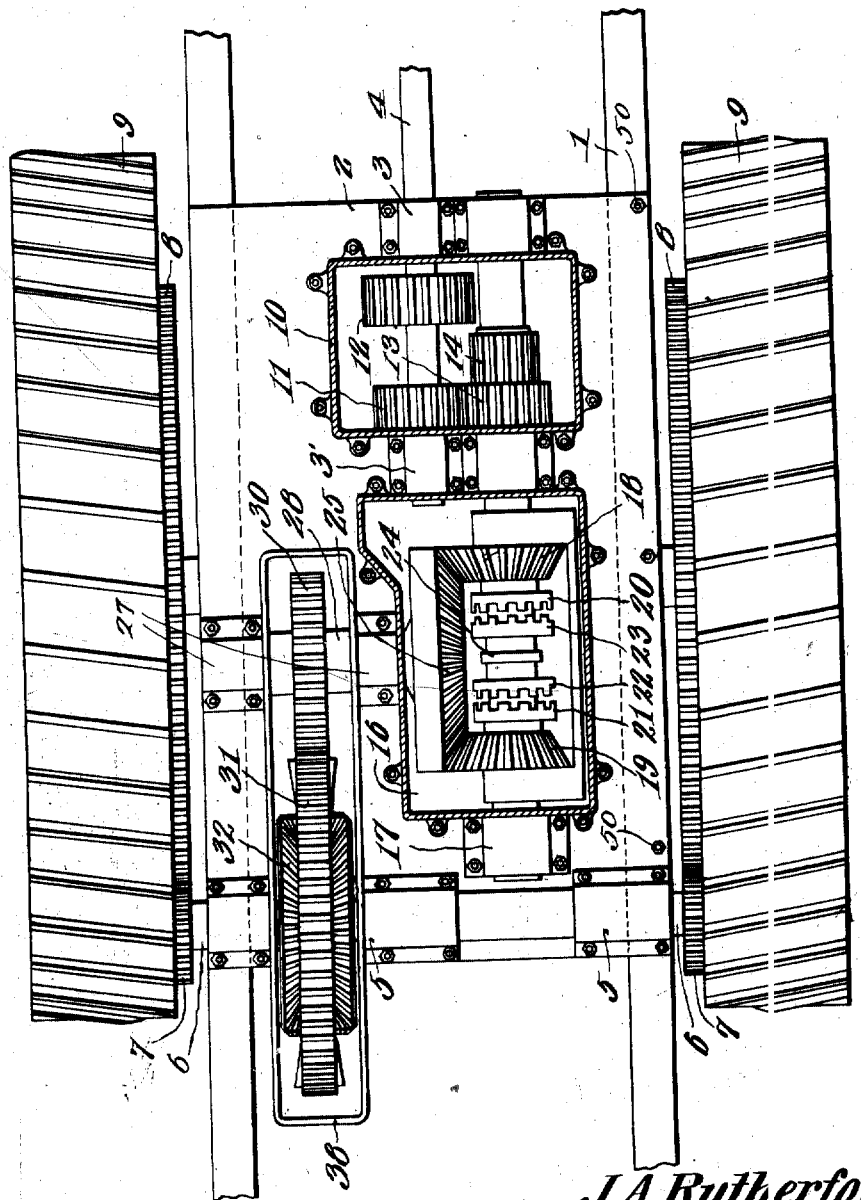

JOHN A. RUTHERFORD, OF GREAT FALLS, MONTANA.

EXPLOSION-ENGINE TRACTOR.

1,215,581. Specification of Letters Patent. Patented Feb. 13, 1917.

Application filed July 3, 1914. Serial No. 848,837.

*To all whom it may concern:*

Be it known that I, JOHN A. RUTHERFORD, a citizen of the United States, residing at Great Falls, in the county of Cascade and State of Montana, have invented a new and useful Explosion-Engine Tractor, of which the following is a specification.

The present invention relates to improvements in explosion engine tractors, one object of the invention, being the provision of a tractor, in which a plate or base carries the reversing gear, and the transmitting gear, so that the same may be assembled and adjusted at one place, and finally connected to the frame of the tractor, and not necessitate the positioning of the various elements upon the frame of the tractor.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings illustrated a view partly in plan and partly in section of the frame of a tractor having the present invention applied.

Referring to the drawings, the numeral 1 designates the frame of a tractor, which in the present instance is taken indicative of any form of channel or I-beam used for this purpose. A plate or base 2 is adapted to be connected thereto by any suitable means indicated at 50 and such base carries the forward bearing 3 for the explosion engine drive shaft 4 and the rear bearings 5 for the two alined shafts 6 provided with the two pinions or gears 7 in the respective ends thereof that coöperate with the gears 8 of the two tractor wheels 9.

Formed at the forward portion of the plate 2 is the housing or casing 10 for the variable speed mechanism, the continuation of the shaft 4 being disposed therein and in the bearing 3' exteriorly of the housing 10, there being keyed or fixed upon the shaft 4 within the housing 10, the low speed gear 11 and the high speed gear 12. A shaft 15 is journaled parallel to the shaft 4 and splined thereupon within the housing 10 are the two gears 13 and 14, which are provided with means (not shown) for operating the same so that the gear 4 may be placed in mesh with the gear 12 to increase the speed at which the present tractor is driven or by means of which the gears 11 and 13 are placed in mesh for the lower speed.

A housing 16 is disposed to the rear of the housing 10 and is carried by the plate 2, this housing 16 forming the housing for the reversing mechanism of the present structure. The shaft 15 extends through the housing 16 and has its rear end journaled in the bearing 17 carried by the plate 2, while freely rotatable upon the shaft 15 within the housing 16 are the two bevel pinions 18 and 19, the said bevel pinions being provided with their respective clutch members 20 and 21 for coöperation with the respective clutch members 22 and 23 of the splined member 24. This member is operated manually through any mechanism desirable (not shown). Journaled in the bearing 27 at right angles to the shaft 15 and exteriorly of the housing 16, is a shaft 28 which has keyed upon its inner end, the large bevel pinion 25, which is in mesh at all times with the bevel pinions 18 and 19, the small pinion 30 being fixed to the shaft 28 so that a forward or reverse movement may be transmitted from the pinion 30 to the gear 31 of the differential transmission 32 for the shafts 6. By this means, it will be seen that a forward or reverse motion at varying speeds may be imparted to the tractor 9.

With this construction, it is evident that the gears that constitute the variable speed mechanism in the housing 10, the reversing mechanism included in the housing 16 and the differential transmission, may be properly assembled upon the base 2 and after such assemblage, the same may be moved so as to be placed upon the frame of the tractor, thus insuring the proper alinement and by providing the rigid plate or base 2 rendering the present construction more easy to assemble and finally install.

What is claimed is:

A transmission unit for tractors, including a flat base plate, separate end and intermediate housings detachably secured upon the base plate, parallel longitudinal shafts journaled within the intermediate housing and one of the end housings, parallel transverse shafts the first one of which is journaled in the intermediate housing and the other end housing and the other being in alinement and journaled within said last named end housing, a differential connected to the alining shafts, means for transmitting motion from the differential to the first transverse shaft, a gear carried by said first transverse shaft and within the intermediate housing, opposed gears within said intermediate housing and upon one of the shafts, said gears being loosely mounted, and meshing with the gear on the transverse shaft, means for coupling either of said opposed gears to its longitudinal shaft, gears shiftable along said longitudinal shaft and within the other end housing, spaced gears upon the other longitudinal shaft and within said end housing, said gears and the shiftable gears constituting change speed gearing.

In testimony that I claim the foregoing as my own, I have hereto affixed my signature in the presence of two witnesses.

JOHN A. RUTHERFORD.

Witnesses:
GEORGE A. JUDSON,
LETTA FOGERTY.